United States Patent
Chae et al.

(10) Patent No.: US 12,283,728 B2
(45) Date of Patent: Apr. 22, 2025

(54) ELECTROLYTE MEMBRANE INCLUDING POLYFLUORENE-BASED IONOMER AND MANUFACTURING METHOD THEREOF

(71) Applicants: HYUNDAI MOTOR COMPANY, Seoul (KR); KIA CORPORATION, Seoul (KR); Industry-Academic Cooperation Foundation Gyeongsang National University, Jinju-si (KR)

(72) Inventors: Il Seok Chae, Seoul (KR); Jong Kil Oh, Yongin-si (KR); Bo Ki Hong, Seoul (KR); Ki Hyun Kim, Seoul (KR); Soon Ki Kwon, Jinju-si (KR); Mi Jeong Kim, Gimhae-si (KR); Han Sol Ko, Changwon-si (KR)

(73) Assignees: Hyundai Motor Company, Seoul (KR); Kia Corporation, Seoul (KR); Industry-Academic Cooperation Foundation Gyeongsang National University, Jinju-si (KR)

( * ) Notice: Subject to any disclaimer, the term of this patent is extended or adjusted under 35 U.S.C. 154(b) by 834 days.

(21) Appl. No.: 17/473,407

(22) Filed: Sep. 13, 2021

(65) Prior Publication Data
US 2022/0093953 A1  Mar. 24, 2022

(30) Foreign Application Priority Data
Sep. 21, 2020  (KR) ........................ 10-2020-0121133

(51) Int. Cl.
*C08G 10/00*  (2006.01)
*C08G 61/02*  (2006.01)
(Continued)

(52) U.S. Cl.
CPC .......... *H01M 8/1023* (2013.01); *C08G 61/02* (2013.01); *C25B 1/04* (2013.01); *C25B 13/08* (2013.01);
(Continued)

(58) Field of Classification Search
CPC ........ C08G 2261/11; C08G 2261/1412; C08G 2261/1424; C08G 2261/146;
(Continued)

(56) References Cited

U.S. PATENT DOCUMENTS

| | | | | |
|---|---|---|---|---|
| 2015/0361223 | A1* | 12/2015 | Woo | C08G 73/0611 136/263 |
| 2021/0087698 | A1* | 3/2021 | Li | B01D 71/281 |
| 2023/0038279 | A1* | 2/2023 | Lee | C25B 13/08 |

FOREIGN PATENT DOCUMENTS

| | | |
|---|---|---|
| CN | 105330825 A | 2/2016 |
| CN | 107634248 A | 1/2018 |

(Continued)

OTHER PUBLICATIONS

Woo-Hyung Lee, et al., "Fluorene-Based Hydroxide Ion Conducting Polymers for Chemically Stable Anion Exchange Membrane Fuel Cells," American Chemical Society, ACS Macro Letters, vol. 4, Feb. 24, 2015, pp. 453-457.

*Primary Examiner* — Uyen M Tran
(74) *Attorney, Agent, or Firm* — Morgan, Lewis & Bockius LLP (57) ABSTRACT

The present disclosure to an electrolyte membrane containing a polyfluorene-based ionomer, and more particularly, to an electrolyte membrane containing a polyfluorene-based ionomer which has a fluorene main chain composed of only a carbon-carbon bond and a side chain composed of a perfluorosulfonic acid group. The electrolyte membrane containing the polyfluorene-based ionomer has high proton (Continued)

conductivity, excellent chemical durability, excellent mechanical property, and excellent volume stability.

11 Claims, 3 Drawing Sheets

(51) Int. Cl.
 *C25B 1/04* (2021.01)
 *C25B 13/08* (2006.01)
 *H01M 8/1023* (2016.01)
 *H01M 8/1081* (2016.01)
 *H01M 8/10* (2016.01)

(52) U.S. Cl.
 CPC ....... *H01M 8/1081* (2013.01); *C08G 2261/11* (2013.01); *C08G 2261/1412* (2013.01); *C08G 2261/1424* (2013.01); *C08G 2261/146* (2013.01); *C08G 2261/3142* (2013.01); *H01M 2008/1095* (2013.01); *H01M 2300/0082* (2013.01)

(58) Field of Classification Search
 CPC .. C08G 2261/3142; H01M 2300/0082; H01M 8/1023; H01M 8/1081; H01M 2008/1095; C25B 1/04
 See application file for complete search history.

(56) References Cited

FOREIGN PATENT DOCUMENTS

| JP | 2018-135487 A | 8/2018 |
| JP | 2019-501999 A | 1/2019 |
| WO | 2005/033182 A1 | 4/2005 |

* cited by examiner

| Sample | Dry state | Wet state |
|---|---|---|
| Nafion 212 | | ΔA ≈ 14.2 % |
| FL1ArF4 | | ΔA ≈ 11.8 % |

[FIG. 5]

ELECTROLYTE MEMBRANE INCLUDING POLYFLUORENE-BASED IONOMER AND MANUFACTURING METHOD THEREOF

CROSS-REFERENCE TO RELATED APPLICATION

This application claims under 35 U.S.C. § 119(a) the benefit of priority to Korean Patent Application No. 10-2020-0121133 filed on Sep. 21, 2020, the entire contents of which are incorporated herein by reference.

BACKGROUND

(a) Technical Field

The present disclosure relates to an electrolyte membrane containing a polyfluorene-based ionomer. More particularly, it relates to an electrolyte membrane containing a polyfluorene-based ionomer which has a fluorene main chain composed of only a carbon-carbon bond and a side chain composed of a perfluorosulfonic acid group. The electrolyte membrane containing the polyfluorene-based ionomer has high proton conductivity, excellent chemical durability, excellent mechanical property, and excellent volume stability.

(b) Background Art

A proton exchange membrane fuel cell (PEMFC) includes an anode, a cathode, and a polymer electrolyte membrane disposed between the anode and cathode, and this configuration is referred to as a membrane-electrode assembly.

Hydrogen which is fuel is supplied to the cathode, and oxygen which is an oxidant is supplied to the anode. The hydrogen supplied to the cathode loses an electron and becomes a proton ($H^+$) to move to the anode through the polymer electrolyte membrane. In this case, the electron generated from the hydrogen performs electrical work in an external circuit of a battery and moves to the anode. In the anode, the proton combines with oxygen and an electron to produce water.

Here, the polymer electrolyte membrane is a cation exchange membrane and selectively transfers only the proton. The polymer electrolyte membrane should have the following characteristics: 1) high ion conductivity, 2) outstanding physicochemical stability, 3) easily scalable, and 4) low cost for production.

Currently, Nafion® which is a typical perfluorinated electrolyte membrane and Gore-Select® which is a perfluorinated porous filled structure membrane from WL Gore & Associates, Inc. have advantages of high ion conductivity and high chemical stability. However, these membranes have problems of 1) decomposition due to oxygen radicals, 2) environmental pollution due to hydrofluoric acid and pollutants in an incineration process, and 3) high cost due to a complicated manufacturing process. Therefore, it is difficult to apply the above membranes to an eco-friendly, high-efficiency, low-cost energy conversion and storage system.

As an alternative to the above membranes, various documents report on the development of hydrocarbon-based ionomers and their applicability in various fields of application. However, the existing hydrocarbon-cation exchange membranes (HC-CEM) developed through condensation polymerization have low chemical stability due to the presence of hetero atoms with low binding energy in a polymer main chain. In addition, owing to a low phase separation effect, an ion transport channel cannot be efficiently formed, and thus ion conductivity is low. In addition to the above description, there is also a problem of poor physical stability.

A material capable of solving the above described problems of the perfluorinated-based and hydrocarbon-based ionomers and satisfying the characteristic required for the polymer electrolyte membrane is desired. To this end, in a material development stage, a polymer structure in which chemically labile bonds are not present in a main chain polymer and a fine phase-separated structure in a part in a polymer structure responsible for ion transport and physico-chemical stability can be clearly formed is desirable. In addition, a method of relatively easily synthesizing the above described polymers using an inexpensive monomer is also desired.

SUMMARY OF THE DISCLOSURE

The present disclosure has been made in an effort to solve the above-described problems associated with prior art.

In one aspect, the present disclosure provides an electrolyte membrane having high ion conductivity and excellent chemical durability.

In another aspect, the present disclosure provides a manufacturing method of an electrolyte membrane which is advantageous for mass production.

Objectives of the present disclosure are not limited to the above-described objectives, and other objectives of the present disclosure, which are not mentioned, can be understood by the following description and also will be apparent through embodiments of the present disclosure. Further, the objectives of the present disclosure can be implemented by means described in the appended claims and a combination thereof.

An electrolyte membrane contains an ionomer expressed as Formula 1a or Formula 1b.

[Formula 1a]

[Formula 1b]

In each of Formulas 1a and 1b, $R_1$ includes hydrogen or an alkyl group having a carbon number ranging from 1 to 3;

$R_2$ includes hydrogen or an alkyl group having a carbon number ranging from 1 to 3; $R_3$ includes at least one among hydrogen, an unsubstituted alkyl group having a carbon number ranging from 1 to 3, and an alkyl group, which is substituted with a halogen element, having a carbon number ranging from 1 to 3; $R_4$ includes an alkyl group having a carbon number ranging from 1 to 7; $R_5$ includes at least one among an unsubstituted alkyl group having a carbon number ranging from 3 to 7, an alkyl group, which is substituted with a halogen element, having a carbon number ranging from 3 to 7, and an ether group in which a part of carbons of the unsubstituted or substituted alkyl group is substituted with oxygen; and n is an integer ranging from 10 to 2,000.

The ionomer may be expressed as Formula 2 below.

[Formula 2]

In Formula 2, n may be an integer ranging from 10 to 2,000.

The electrolyte membrane may be applied to a fuel cell and/or a water electrolysis device.

A manufacturing method of an electrolyte membrane according to the present disclosure includes preparing a first precursor of Formula 3 by reacting a hydrocarbon compound having a carbon number ranging from 2 to 10, which contains a fluorene-based monomer and a halogen element, in the presence of an acid catalyst:

[Formula 3]

(in Formula 3, $R_1$ includes hydrogen or an alkyl group having a carbon number ranging from 1 to 3; $R_2$ includes hydrogen or an alkyl group having a carbon number ranging from 1 to 3; $R_3$ includes at least one among hydrogen, an unsubstituted alkyl group having a carbon number ranging from 1 to 3, and an alkyl group, which is substituted with a halogen element, having a carbon number ranging from 1 to 3; $R_4$ includes an alkyl group having a carbon number ranging from 1 to 7; $X_1$ includes a halogen element; and n is an integer ranging from 10 to 2,000);

preparing a second precursor expressed as Formula 4 by reacting the first precursor with a phenolic compound:

[Formula 4]

(in Formula 4, $R_1$, $R_2$, $R_3$, and $R_4$ are the same as in Formula 3, $X_2$ includes a halogen element, and n is integer ranging from 10 to 2,000);

preparing an ionomer expressed as Formula 1a by reacting the second precursor with a sulfonic acid-based compound; preparing a polymer solution containing the ionomer and a solvent; and applying the polymer solution on a substrate to manufacture an electrolyte membrane.

The acid catalyst may include at least one selected from the group consisting of aluminum chloride, trifluoromethanesulfonic acid (TFSA), hydrochloric acid, hydrofluoric acid, paratoluene acid, and a combination thereof.

The first precursor may be prepared through reaction at a temperature ranging from 5° C. to 25° C. for one hour to two hours.

A weight average molecular weight of the first precursor may range from 10,000 g/mol to 1,000,000 g/mol.

A weight average molecular weight of the second precursor may range from 10,000 g/mol to 1,500,000 g/mol.

Other aspects and preferred embodiments of the present disclosure are discussed infra.

The above and other features of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

The above and other objectives, features, and advantages of the present disclosure will become more apparent from the following description of preferred embodiments with reference to the accompanying drawings. However, the present disclosure is not limited to the embodiments disclosed herein and may be implemented in other forms. The embodiments disclosed herein will be provided to make this disclosure thorough and complete, and will fully convey the spirit of the present disclosure to those skilled in the art.

In describing each drawing, similar reference numerals are assigned similar components. In the accompanying drawings, dimensions of structures are shown in an enlarged scale for clarity of the present invention. Although the terms "first," "second," and the like may be used herein to describe various components, these components should not be limited to these terms. The terms are used only for the purpose of distinguishing one component from another component. For example, without departing from the scope of the present disclosure, a first component may be referred to as a second component, and similarly, a second component may also be referred to as a first component. Unless the context clearly dictates otherwise, the singular form includes the plural form.

It should be understood that the terms "comprise," "include," and "have" specify the presence of stated herein features, numbers, steps, operations, components, elements, or combinations thereof, but do not preclude the presence or possibility of adding one or more other features, numbers, steps, operations, components, elements, or combinations thereof. In addition, when a portion of a layer, a film, a region, a plate, or the like is referred to as being "on" other portion, this includes not only a case in which the portion is "directly on" the other portion but also a case in which another portion is present between the portion and the other portion. Contrarily, when a portion of a layer, a film, a region, a plate, or the like is referred to as being "under" other portion, this includes not only a case in which the portion is "directly under" the other portion but also a case in which another portion is present between the portion and the other portion.

Unless otherwise specified, all numbers, values, and/or expressions indicating ingredients, reaction conditions, polymer compositions, and quantities of combination products used herein are approximations to which various uncertainties of measurement are reflected, wherein the various uncertainties occur in obtaining these values among essentially different other things so that it should be understood that all numbers, values, and/or expressions are modified by a term "about." In addition, when a numerical range is disclosed herein, such a numerical range is continuous and, unless otherwise indicated, the numerical range includes all values from a minimum value to a maximum value. Further, when the numerical range refers to integers, unless otherwise indicated, all integers from a minimum value to a maximum value are included.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

An electrolyte membrane according to the present disclosure contains an ionomer expressed as Formula 1a or Formula 1b.

[Formula 1a]

[Formula 1b]

In each of Formulas 1a and 1b, $R_1$ includes hydrogen or an alkyl group having a carbon number ranging from 1 to 3.

In addition, $R_2$ includes hydrogen or an alkyl group having a carbon number ranging from 1 to 3.

In addition, $R_3$ includes at least one among hydrogen, an unsubstituted alkyl group having a carbon number ranging from 1 to 3, and an alkyl group, which is substituted with a halogen element, having a carbon number ranging from 1 to 3.

In addition, $R_4$ includes an alkyl group having a carbon number ranging from 1 to 7.

In addition, $R_5$ includes at least one among an unsubstituted alkyl group having a carbon number ranging from 3 to 7, an alkyl group, which is substituted with a halogen element, having a carbon number ranging from 3 to 7, and an ether group in which a part of carbon of the unsubstituted or substituted alkyl group is substituted with oxygen.

In addition, n is an integer ranging from 10 to 2,000.

Recently, various research results have reported problems in that a hydrocarbon-based ionomer with an aryl ether bond (Csp2-O) or a bond (benzylic C—H bond) with low bond energy is decomposed in a driving condition of its application. The hydrocarbon-based ionomer according to the present disclosure is technically characterized in that a weak bond is not present in a main chain and is a polymer composed of only carbon-carbon bonds. Thus, the ionomer disclosed herein has excellent chemical stability because a main chain is entirely composed of only carbon-carbon bonds.

In addition, it is characterized in that the hydrocarbon-based ionomer is designed as a branched polymer so as to promote a hydrophilic/hydrophobic fine phase separation structure and is formed of an alkyl structure having a flexible and long side chain and, a cation exchange functional group such as a perfluorosulfonic acid group is introduced to an end of the hydrocarbon-based ionomer. Most of moisture/electrolyte, which play important roles in ion conduction of the hydrocarbon-based ionomer, are distributed around the ion exchange functional group. According to the present disclosure, a chain length of the side chain is variously controlled to block interaction of the water/electrolyte with the main chain. In addition, the present disclosure is characterized in that the perfluorinated sulfonic acid having excellent ion dissociation is introduced to only a portion of the end of the side chain so that ion conduction behavior and physicochemical stability are simultaneously improved due to a distinct hydrophilic/hydrophobic phase separation effect.

The hydrocarbon-based ionomer according to the present disclosure may be expressed as Formula 2 below.

[Formula 2]

In Formula 2, n is an integer ranging from 10 to 2,000.

The manufacturing method of an electrolyte membrane according to the present disclosure includes preparing a first precursor of Formula 3 by reacting a hydrocarbon compound having a carbon number ranging from 2 to 10, which contains a fluorene-based monomer and a halogen element, in the presence of an acid catalyst:

[Formula 3]

(In Formula 3, $R_1$ includes hydrogen or an alkyl group having a carbon number ranging from 1 to 3; $R_2$ includes hydrogen or an alkyl group having a carbon number ranging from 1 to 3; $R_3$ includes at least one among hydrogen, an unsubstituted alkyl group having a carbon number ranging from 1 to 3, and an alkyl group, which is substituted with a halogen element, having a carbon number ranging from 1 to 3; $R_4$ includes an alkyl group having a carbon number ranging from 1 to 7; $X_1$ is a halogen; and n is an integer ranging from 10 to 2,000); preparing a second precursor expressed as Formula 4 by reacting the first precursor with a phenolic compound:

[Formula 4]

(In Formula 4, $R_1$, $R_2$, $R_3$, and $R_4$ are the same as in Formula 3, $X_2$ is a halogen, and n is an integer ranging from 10 to 2,000); preparing an ionomer expressed as Formula 1a by reacting the second precursor with a sulfonic acid-based compound; preparing a polymer solution containing the ionomer and a solvent; and applying the polymer solution on a substrate to manufacture an electrolyte membrane.

The manufacturing method according to the present disclosure is characterized in that a monomer of which a manufacturing condition is mild, and which is advantageous for mass production and industrialization is used to be suitable for mass production. A hydrocarbon-based polymer used in the existing cation exchange membrane may be obtained through condensation polymerization at high temperature for a long period of time in the presence of a base catalyst. Meanwhile, the ionomer according to the present disclosure may be obtained through condensation polymerization at room temperature for a period of one hour to two hours in the presence of an acid catalyst. In the present specification, the "room temperature" means a temperature ranging from 0° C. to 40° C. or from 5° C. to 25° C.

The acid, catalyst used in the preparation of the first precursor may include at least one selected from the group consisting of aluminum chloride, trifluoromethanesulfonic acid (TFSA), hydrochloric acid, hydrofluoric acid, paratoluene acid, and a combination thereof.

In addition, the first precursor may be obtained by reacting a fluorene-based monomer and a hydrocarbon compound at a temperature ranging from of 5° C. to 25° C. for one hour to two hours.

Meanwhile, a weight average molecular weight of the first precursor may range from 10,000 g/mol to 1,000,000 g/mol. In addition, a weight average molecular weight of the second precursor may range from 10,000 g/mol to 1,500,000 g/mol.

Hereinafter, the present disclosure will be described in more detail based on examples, but the present disclosure is not limited by the following examples.

Preparation Example—Preparation of Ionomer

An ionomer was prepared according to Reaction Formula 1 below.

[Reaction Formula 1]

(1)

(1) Preparation of First Precursor 9,9-dimethylfluorene (2 g and 10.40 mmol) and 7-bromo-1,1,1-trifluoroheptan-2-one (2.83 g and 11.44 mmol) were used as monomers. TFSA (9.2 g and 104.02 mmol) was used as an acid catalyst. 26.5 wt % dichloromethane (DCM) based on weights of the monomers was used as a reaction solvent. The monomers and a catalyst were put into to the reaction solvent and reacted at a temperature of about 5° C. for about one hour to synthesize a first precursor. After the reaction, the first precursor was precipitated in methanol (500 ml), washed several times with the methanol, and dried in a vacuum oven at a temperature of 50° C.

(2) Preparation of Second Precursor

The first precursor (2 g and 4.72 mmol) and 4-iodophenol (2.60 g and 11.81 mmol) were used as raw materials. Potassium carbonate (1.63 g and 11.81 mmol) was used as a catalyst. 8 wt % N,N-dimethylformamide (DMF) based on a weight of the raw materials was used as a reaction solvent. The raw materials and a catalyst were put into to the reaction solvent and reacted at a temperature of about 90° C. for about three hours to synthesize a second precursor. After the reaction, the second precursor was precipitated in a solution in which methanol (1,000 ml) was mixed with hydrochloric acid (100 ml and 2 M), washed several times with distilled water, and dried in a vacuum oven at a temperature of 50° C.

In this case, a molecular weight of each of the first precursor and the second precursor was measured. Gel permeation chromatography analysis was performed, tetrahydrofuran (THF) was used as a solvent, and polystyrene was used as a standard material. The results are shown in Table 1 below.

TABLE 1

| Items | Mn [g/mol] | Mw [g/mol] | PDI |
| --- | --- | --- | --- |
| First precursor | 69,100 | 366,100 | 5.30 |
| Second precursor | 75,200 | 345,600 | 4.60 |

(3) Synthesis of Ionomer

The second precursor (1 g and 1.78 mmol) and sodium 1,1,2,2-tetrafluoro-2-(1,1,2,2-tetrafluoro-2-iodoethoxy) ethanesulfonate ($ICF_2CF_2OCF_2CF_2SO_3Na$) (2.3 g and 5.33 mmol) were used as raw materials. Copper powder (1.13 g and 17.78 mmol) was used as a catalyst. 10 wt % N,N-dimethylacetamide (DMAc) based on a weight of the raw materials was used as a reaction solvent. The raw materials and a catalyst were put into the reaction solvent, a temperature was raised to 95° C., 120° C., and 165° C., and the raw materials and the catalyst were reacted for three hours and twenty-four hours to synthesize an ionomer. After the reaction, the ionomer was filtered and centrifuged to remove the catalyst and dried in a vacuum oven at a temperature of 50° C. Hereinafter, the ionomer is referred to as $FL1C_7ArF_4$. In addition, although the ionomer has been illustrated in the form of a sodium salt in Reaction Formula 1, an electrolyte membrane is manufactured of the ionomer, and, when the electrolyte membrane contains water, the sodium is ionized.

EXAMPLE

Figure 1:
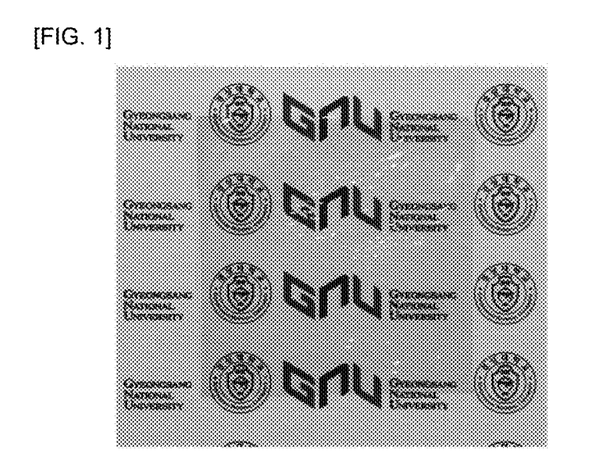
FIG. 1 is a photograph showing an electrolyte membrane according to the present disclosure.

A solution was prepared by mixing 0.5 g of $FL1C_7ArF_4$ with 2.0 g of DMAc, cast on a glass plate, and then dried in a vacuum oven at a temperature of 50° C. for six hours to manufacture a membrane. The manufactured membrane was separated from the glass plate using a water infiltration method, put into a desiccator, and dried to finally obtain an electrolyte membrane having a thickness of 20 μm. The results are shown in FIG. 1.

Experimental Example 1—Evaluation of Chemical Durability

Chemical durability of the electrolyte membrane ($FL1C_7ArF_4$) according to the present invention was measured by the following method.

A Fenton's reagent was prepared by putting 4 ppm Iron (II) sulfate into 3% hydrogen peroxide aqueous solution. The dried electrolyte membrane was cut into a size of 1 cm×1 cm, put into a vial with the Fenton's reagent, and then placed in an oven at a temperature of 80° C., and a state of the electrolyte membrane was observed at every ten minutes. τ1 means a time when a film begins to be decomposed, and τ2 means a time when the film is completely decomposed to be visually disappeared.

As Comparative Example, SPAES65 which is a typical hydrocarbon ionomer expressed as a formula below was used.

Figure 2:
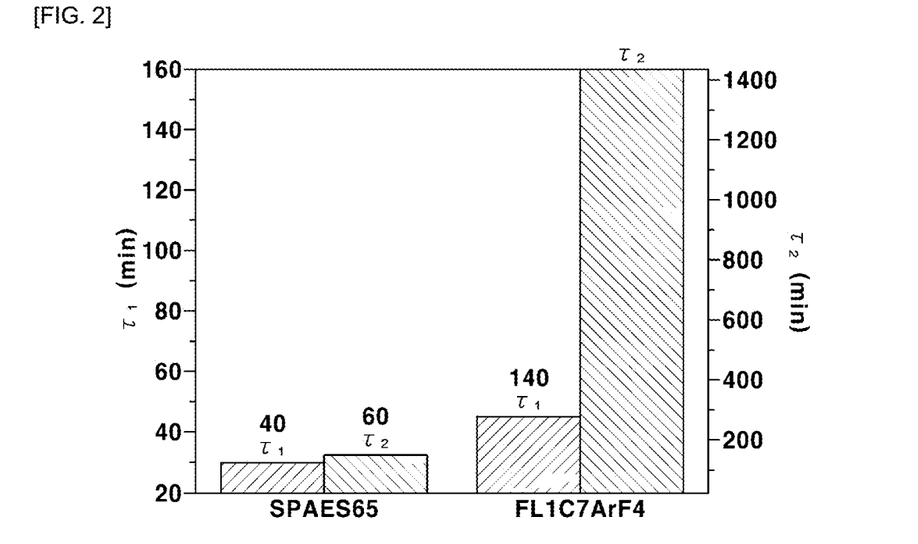
FIG. 2 is a graph showing results of evaluating chemical durability of the electrolyte membrane according to the present disclosure.

The results are shown in FIG. 2. Referring to the results, when compared with Comparative Example, the electrolyte membrane according to the present disclosure exhibited chemical durability of three times or more in τ1 and twenty-three times or more in τ2. It was confirmed that, since the main chain was composed of only carbon-carbon bonds, the electrolyte membrane according to the present disclosure had excellent chemical durability as compared with Comparative Example in which the main chain was not composed of only carbon-carbon bonds.

Experimental Example 2—Evaluation of Mechanical Property

Mechanical property of the electrolyte membrane (FL1C$_7$ArF$_4$) according to the present disclosure was measured through Lloyd LR-10K, and specimens were prepared according to ASTM standard D638 (Type V specimens). Tensile strength was measured at a rate of 10 mm per minute in a condition in which a temperature was 25° C. and relative humidity (RH) ranged from 20% to 40%. In a measurement experiment of the mechanical property, at least five specimens were prepared and measured, and an average value thereof was calculated.

Nafion 212 (Sigma-Aldrich Co.) was used as Comparative Example.

Figure 3:
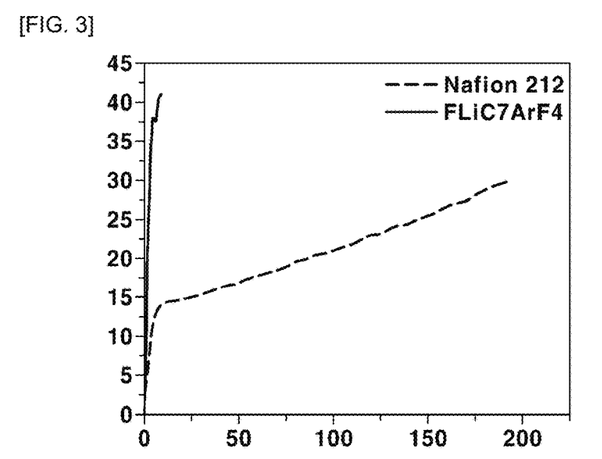
FIG. 3 is a graph showing results of evaluating a mechanical property of the electrolyte membrane according to the present disclosure.

The results are shown in FIG. 3. Referring to the results, it can be seen that the tensile strength of the electrolyte membrane according to the present disclosure was about 43.8 MPa and was superior to Comparative Example (30.1 MPa).

Experimental Example 3—Evaluation of Volume Stability

Figure 4:
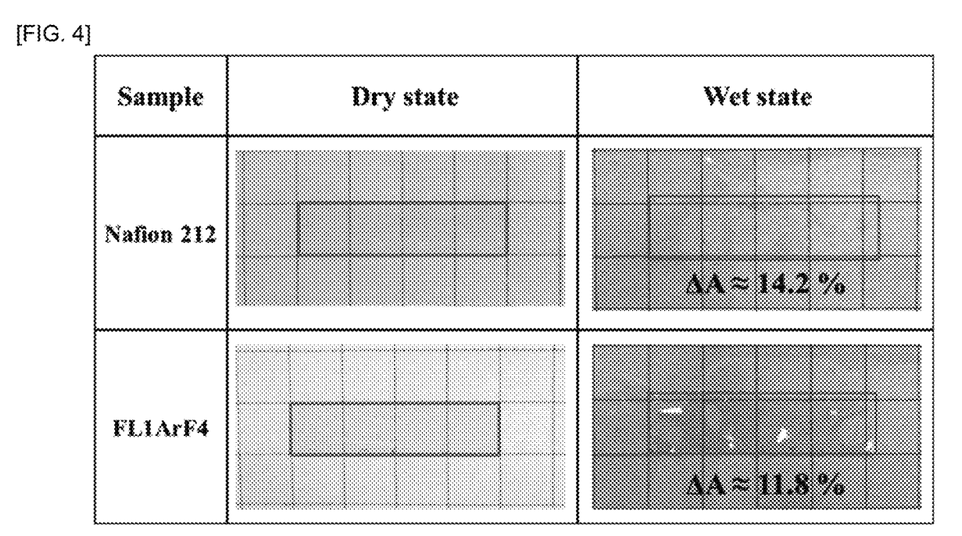
FIG. 4 is a diagram illustrating results of evaluating volume stability of the electrolyte membrane according to the present disclosure.

Water absorption and a change in dimension of the electrolyte membrane (FL1C$_7$ArF$_4$) according to the present disclosure were measured. The electrolyte membrane was dried through a desiccator and cut into a size of 1 cm×4 cm, and a thickness and a weight of the electrolyte membrane were measured. The electrolyte membrane was put into a vial, the vial was filled with distilled water, and the electrolyte membrane was put into a dry oven at a temperature of 30° C. After twelve hours, an area, a thickness, and a weight of the swollen membrane were measured, and a change in dimension was measured using the following equations.

$$\text{Water uptake (WU) [\%]} = [(W_{wet} - W_{dry})/W_{dry}] \times 100$$

$$\text{Change in dimension [\%]} = [((A_{wet} \times T_{wet}) - (A_{dry} \times T_{dry}))/(A_{dry} \times T_{dry})] \times 100$$

$W_{dry}$ and $W_{wet}$ are weights of the dried membrane and the swollen membrane, respectively, $A_{dry}$ and $A_{wet}$ are areas of the dried membrane and the swollen membrane, respectively, and $T_{dry}$ and $T_{wet}$ are thicknesses of the dried membrane and the swollen membrane, respectively.

Nafion 212 (Sigma-Aldrich Co.) was used as Comparative Example.

The results are shown in FIG. 4 and Table 2.

TABLE 2

| Items | WU[%] | ΔLength | ΔWidth | ΔThickness | ΔVolume |
|---|---|---|---|---|---|
| Comparative Example | 12.7 | 8.8 | 5.0 | 10.3 | 26.0 |
| Example | 10.3 | 5.9 | 5.6 | 10.3 | 23.3 |

Referring to FIG. 4 and Table 2, it can be seen that the change in dimension of the electrolyte membrane according to the present disclosure was smaller.

Experimental Example 4—Evaluation of Ion Conductivity

Proton conductivity of the electrolyte membrane (FL1C$_7$ArF$_4$) according to the present disclosure was measured. An electrolyte membrane specimen of 1×4 cm$^2$ was prepared and engaged with a four-probe cell, and then proton conductivity was measured using BekkTech BT-552MX equipment.

A measurement condition was set to a temperature of 80° C. and a total humidity range. Relative humidity was calculated through the following equation using a ratio of a vapor pressure P(Td) at a dew point of water to a saturated vapor pressure of a gas at a temperature of 80° C.

$$RH(\%) = P(Td)/P(Ts) \times 100$$

Before the measurement, after temperature/humidity equilibrium was maintained in a condition in which a temperature was 80° C. and RH was 70% for two hours, the ion conductivity was measured by decreasing humidity from 70% RH to 20% RH. Again, the ion conductivity was measured by increasing the humidity from 20% RH to 100% RH. An RH section was adjusted to 10%, a resistance value was measured at every 10% RH, a conductivity value was calculated using an equation for measuring proton conductivity in a surface direction, and humidity equilibrium was maintained for fifteen minutes in each humidity condition. An ion conductivity value extracted for each humidity (reduced proton conductivity) was recorded.

Nafion 212 (Sigma-Aldrich Co.) was used as Comparative Example.

Figure 5:
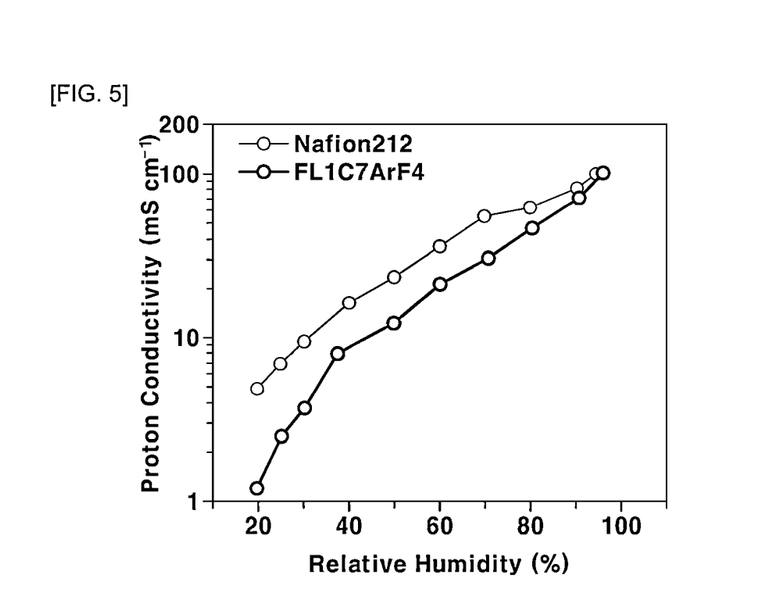
FIG. 5 is a graph showing results of evaluating ion conductivity of the electrolyte membrane according to the present disclosure.

The results are shown in FIG. 5. Referring to the results, it can be seen that the electrolyte membrane according to the present disclosure exhibited the same level of proton conductivity as the Nafion-based electrolyte membrane which is a typical electrolyte membrane.

In accordance with the present disclosure, it is possible to obtain an electrolyte membrane having high ion conductivity and excellent chemical durability.

In addition, in accordance with the present disclosure, it is possible to mass-produce the above electrolyte membrane in an easy method.

The effects of the present disclosure are not limited to the above-described effects. It should be understood that the effects of the present disclosure include all effects which can be inferred from the above description.

While the embodiments of the present disclosure have been described with reference to the accompanying drawings, those skilled in the art can understand that the present disclosure can be implemented in other specific forms without departing from the technical spirit or the necessary features of the present disclosure. Therefore, it should be understood that the above-described embodiments are not restrictive but illustrative in all aspects.

What is claimed is:

1. An electrolyte membrane containing an ionomer expressed as Formula 1a or Formula 1b:

[Formula 1a]

[Formula 1b]

wherein, in each of Formulas 1a and 1b, $R_1$=hydrogen or an alkyl group having a carbon number ranging from 1 to 3; $R_2$=hydrogen or an alkyl group having a carbon number ranging from 1 to 3; $R_3$=at least one among hydrogen, an unsubstituted alkyl group having a carbon number ranging from 1 to 3, and an alkyl group, which is substituted with a halogen element, having a carbon number ranging from 1 to 3; $R_4$=an alkyl group having a carbon number ranging from 1 to 7; $R_5$=at least one among an unsubstituted alkyl group having a carbon number ranging from 3 to 7, an alkyl group, which is substituted with a halogen, having a carbon number ranging from 3 to 7, and an ether group in which a part of carbon of the unsubstituted or substituted alkyl group is substituted with oxygen; and n is an integer ranging from 10 to 2,000.

2. The electrolyte membrane of claim 1, wherein the ionomer is expressed as Formula 2 below:

[Formula 2]

wherein, in Formula 2, n is an integer ranging from 10 to 2,000.

3. A fuel cell comprising the electrolyte membrane according to claim 1.

4. A water electrolysis device comprising the electrolyte membrane according to claim 1.

5. A manufacturing method of an electrolyte membrane, comprising:
preparing a first precursor by reacting a hydrocarbon compound having a carbon number ranging from 2 to 10, which contains a fluorene-based monomer and a halogen element, in the presence of an acid catalyst;
preparing a second precursor by reacting the first precursor with a phenolic compound;
preparing an ionomer expressed as Formula 1a by reacting the second precursor with a sulfonic acid-based compound:

[Formula 1a]

wherein in Formula 1a, $R_1$=hydrogen or an alkyl group having a carbon number ranging from 1 to 3; $R_2$=hydrogen or an alkyl group having a carbon number ranging from 1 to 3; $R_3$=at least one among hydrogen, an unsubstituted alkyl group having a carbon number ranging from 1 to 3, and an alkyl group, which is substituted with a halogen element, having a carbon number ranging from 1 to 3; $R_4$=an alkyl group having a carbon number ranging from 1 to 7; $R_5$=at least one among an unsubstituted alkyl group having a carbon number ranging from 3 to 7, an alkyl group, which is substituted with a halogen, having a carbon number ranging from 3 to 7, and an ether group in which a part of carbon of the unsubstituted or substituted alkyl group is substituted with oxygen; and n is an integer ranging from 10 to 2,000;
preparing a polymer solution containing the ionomer and a solvent; and
applying the polymer solution on a substrate to manufacture an electrolyte membrane.

6. The manufacturing method of claim 5, wherein the first precursor is expressed as Formula 3 below:

[Formula 3]

wherein in Formula 3, $R_1$=hydrogen or an alkyl group having a carbon number ranging from 1 to 3; $R_2$=hydrogen or an alkyl group having a carbon number ranging from 1 to 3; $R_3$=at least one among hydrogen, an unsubstituted alkyl group having a carbon number ranging from 1 to 3, and an alkyl group, which is substituted with a halogen element, having a carbon number ranging from 1 to 3; $R_4$=an alkyl group having a carbon number ranging from 1 to 7; $X_1$ is a halogen; and n is an integer ranging from 10 to 2,000.

7. The manufacturing method of claim 5, wherein the second precursor is expressed as Formula 4 below:

[Formula 4]

wherein in Formula 4, $R_1$=hydrogen or an alkyl group having a carbon number ranging from 1 to 3; $R_2$=hydrogen or an alkyl group having a carbon number ranging from 1 to 3; $R_3$=at least one among hydrogen, an unsubstituted alkyl group having a carbon number ranging from 1 to 3, and an alkyl group, which is substituted with a halogen element, having a carbon number ranging from 1 to 3; $R_4$=an alkyl group having a carbon number ranging from 1 to 7; $X_2$ is a halogen; and n is an integer ranging from 10 to 2,000.

8. The manufacturing method of claim 5, wherein the acid catalyst includes at least one selected from the group consisting of aluminum chloride, trifluoromethanesulfonic acid (TFSA), hydrochloric acid, hydrofluoric acid, and paratoluene acid.

9. The manufacturing method of claim 5, wherein the first precursor is prepared through reaction at a temperature ranging from 5° C. to 25° C. for a period of one hour to two hours.

10. The manufacturing method of claim 5, wherein a weight average molecular weight of the first precursor ranges from 10,000 g/mol to 1,000,000 g/mol.

11. The manufacturing method of claim 5, wherein a weight average molecular weight of the second precursor ranges from 10,000 g/mol to 1,500,000 g/mol.

* * * * *